(12) United States Patent
Schrupp et al.

(10) Patent No.: US 11,847,170 B2
(45) Date of Patent: Dec. 19, 2023

(54) DATA VISUALIZATION TOOL WITH GUIDED VISUALIZATION CREATION AND SECURE PUBLICATION FEATURES, AND GRAPHICAL USER INTERFACE THEREOF

(71) Applicant: Target Brands, Inc., Minneapolis, MN (US)

(72) Inventors: Ryan Schrupp, Minneapolis, MN (US); Jeremy Woelfel, Bradenton, FL (US); Paul Algren, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 463 days.

(21) Appl. No.: 16/746,560

(22) Filed: Jan. 17, 2020

(65) Prior Publication Data

US 2021/0224328 A1    Jul. 22, 2021

(51) Int. Cl.

| G06F 16/00 | (2019.01) |
| G06F 16/9035 | (2019.01) |
| G06F 16/904 | (2019.01) |
| G06F 16/9038 | (2019.01) |
| G06F 16/9535 | (2019.01) |

(52) U.S. Cl.
CPC ........ *G06F 16/9035* (2019.01); *G06F 16/904* (2019.01); *G06F 16/9038* (2019.01); *G06F 16/9535* (2019.01)

(58) Field of Classification Search
CPC ................................................. G06F 16/9535
See application file for complete search history.

(56) References Cited

U.S. PATENT DOCUMENTS

| 6,154,766 | A | 11/2000 | Yost et al. |
| 7,490,110 | B2 | 2/2009 | Ewen et al. |
| 7,559,048 | B1 | 7/2009 | Bedell et al. |
| 7,925,616 | B2 | 4/2011 | Hurwood et al. |
| 8,032,488 | B2 | 10/2011 | Lashley et al. |
| D664,981 | S | 8/2012 | Rai et al. |
| 8,266,148 | B2 | 9/2012 | Guha et al. |
| D678,313 | S | 3/2013 | Howes et al. |

(Continued)

OTHER PUBLICATIONS

"AmCharts 4 Demos." Retrieved from the Internet: URL: <https://www.amcharts.com/demos/>. Retrieved on Dec. 27, 2018, 86 pages.

(Continued)

*Primary Examiner* — Ajith Jacob
(74) *Attorney, Agent, or Firm* — Merchant & Gould P.C.

(57) ABSTRACT

Methods and systems for generating and distributing data visualizations are provided. One method includes displaying a user interface including a canvas and a card builder toolset, the card builder toolset including a plurality of selectable options, each of the plurality of selectable options responsive to user input to present a definition screen including one or more card definition parameter input fields. The method further includes receiving user input into the one or more card definition parameter input fields for each of the plurality of selectable options and, in response, defining at least one aspect of a card to be included within a user dashboard presented on the canvas. The method also includes rendering a card within the canvas in accordance with parameters defined by the user input, the card being included within a dashboard to be displayed to users.

19 Claims, 21 Drawing Sheets

(56) References Cited

U.S. PATENT DOCUMENTS

| | | | |
|---|---|---|---|
| D685,812 S | 7/2013 | Bork et al. | |
| 8,566,301 B2 | 10/2013 | Rueben et al. | |
| D696,681 S | 12/2013 | Kim et al. | |
| D699,260 S | 2/2014 | Lindmark et al. | |
| 8,738,543 B2 | 5/2014 | Forbes et al. | |
| D712,918 S | 9/2014 | Frick et al. | |
| 8,860,727 B2 | 10/2014 | Beers et al. | |
| D723,048 S | 2/2015 | Helliker et al. | |
| 9,081,975 B2 | 7/2015 | Ducott, III et al. | |
| 9,116,954 B1 | 8/2015 | Cappiello et al. | |
| 9,235,978 B1 | 1/2016 | Charlton | |
| 9,292,571 B1 | 3/2016 | Kiryakov et al. | |
| 9,413,807 B1 | 8/2016 | Sherman et al. | |
| 9,424,318 B2 | 8/2016 | Anand et al. | |
| D766,940 S | 9/2016 | Napper et al. | |
| D769,908 S | 10/2016 | Cook | |
| D785,022 S | 4/2017 | Vazquez et al. | |
| 9,613,099 B2 | 4/2017 | Molloy et al. | |
| 9,619,115 B2 | 4/2017 | Kim et al. | |
| 9,633,076 B1 | 4/2017 | Morton et al. | |
| D792,437 S | 7/2017 | Cianflone et al. | |
| 9,710,527 B1 | 7/2017 | Sherman | |
| D794,665 S | 8/2017 | Willis | |
| 9,779,147 B1 | 10/2017 | Sherman et al. | |
| 9,792,017 B1 | 10/2017 | Landefeld et al. | |
| 9,818,211 B1 | 11/2017 | Gibb et al. | |
| 9,836,502 B2 | 12/2017 | Papale et al. | |
| 9,846,904 B2 | 12/2017 | Alcott et al. | |
| D816,703 S | 5/2018 | Willis et al. | |
| D818,476 S | 5/2018 | Hawkins et al. | |
| D820,288 S | 6/2018 | Howell et al. | |
| D820,292 S | 6/2018 | Mander et al. | |
| D820,293 S | 6/2018 | Poel et al. | |
| D820,864 S | 6/2018 | Eder | |
| D823,328 S | 7/2018 | Durkan et al. | |
| D826,972 S | 8/2018 | Madhavan et al. | |
| 10,114,867 B2 | 10/2018 | Marcotte et al. | |
| 10,176,226 B2 | 1/2019 | Tabb et al. | |
| 10,223,099 B2 | 3/2019 | Avant | |
| 10,242,079 B2 | 3/2019 | Kim et al. | |
| D847,165 S | 4/2019 | Kolbenheyer | |
| 10,262,030 B1 | 4/2019 | Burtenshaw et al. | |
| D857,056 S | 8/2019 | Lofberg et al. | |
| 2004/0254911 A1 | 12/2004 | Grasso et al. | |
| 2006/0247948 A1 | 11/2006 | Ellis et al. | |
| 2008/0307343 A1 | 12/2008 | Robert et al. | |
| 2011/0055202 A1 | 3/2011 | Heimendinger | |
| 2012/0324353 A1 | 12/2012 | Torbey et al. | |
| 2014/0149839 A1 | 5/2014 | Bedard et al. | |
| 2015/0081692 A1 | 3/2015 | Mackinlay et al. | |
| 2016/0275152 A1 | 9/2016 | Gunjan | |
| 2017/0351407 A1 | 12/2017 | Landefeld et al. | |
| 2018/0033180 A1 | 2/2018 | Geddes | |
| 2018/0040154 A1 | 2/2018 | Gibb et al. | |
| 2018/0067998 A1 | 3/2018 | Sherman et al. | |
| 2018/0129720 A1 | 5/2018 | Kim et al. | |
| 2018/0165329 A1 | 6/2018 | Tabb et al. | |
| 2018/0189294 A1 | 7/2018 | Anand et al. | |
| 2018/0322429 A1 | 11/2018 | Nesanelis et al. | |
| 2019/0026084 A1* | 1/2019 | Elliot | G06F 8/41 |
| 2019/0034065 A1* | 1/2019 | Prophete | G06F 3/04845 |
| 2019/0050466 A1 | 2/2019 | Kim et al. | |
| 2019/0108272 A1 | 4/2019 | Talbot et al. | |
| 2019/0373028 A1 | 12/2019 | Kasula | |

OTHER PUBLICATIONS

"Cards." Retrieved from the Internet: URL: <https://declara.com/content/ZaKdnOP1>. Retrieved on Dec. 27, 2018, 43 pages.

"Druid Joins" Retrieved from the Internet: <URL: https://druid.apache.org/docs/latest/querying/joins.html> Retrieved on Jun. 5, 2019, 2 pages.

"Druid Technology" <URL: https://druid.apache.org/technology>, Retrieved on Jun. 4, 2019, 8 pages.

"Druid Use Cases." Retrieved from the Internet: <URL: https://druid.apache.org/use-cases>. Retrieved on Jun. 4, 2019, 4 pages.

"Druid." Retrieved from the Internet: <URL: http://druid.io/druid.html>. Retrieved on Jun. 7, 2017, 2 pages.

"Implementing your theme." Retrieved from the Internet: URL: <https://material.io/design/material-theming/implementing-your-theme.html#>.Retrieved on Dec. 27, 2018, 22 pages.

"Showcase" Retrieved from the Internet: <URL: https://material-ui.com/discover-more/showcase>. Retrieved on Dec. 27, 2018, 18 pages.

Muthiah et al., "How Druid enables analytics at Airbnb." Retrieved from the Internet: <URL: https://medium.com/airbnb-engineering/druid airbnb-data-platform-601c312f2a4c>, Nov. 13, 2018, 10 pages.

Data Visualization WIP-Zubko, https://dribbble.com/shots/2015631-Data-Visualization-WIP, 2 pages (Year: 2015).

Ggplot GUI, https://web.archive.org/web/20170718141233/https://cran.r-project.org/web/packages/ggplotgui/README.html, 3 pages (Year: 2017).

* cited by examiner

FIG. 3

Home

FAVORITES

My cards

★ Data (Prior Day)

| Date | Region | Ad | Ad Comp % |
|---|---|---|---|
| 12-16-2018 | 100 | | ##% |
| 12-16-2018 | 200 | | ##% |
| 12-16-2018 | 300 | | ##% |
| 12-16-2018 | 400 | | ##% |

★ Data Overview

| Store | Sales Dollars | Comp% |
|---|---|---|
| T0003 | $###.## | ##% |
| T0004 | $###.## | ##% |
| T0005 | $###.## | ##% |
| T0012 | $###.## | ##% |
| T0013 | $###.## | ##% |
| T0019 | $###.## | ##% |

★ Items to Review
No results were found

★ data year over year

My Dashboards

★ Dashboard Title
9 cards
SmithJohn
SmithJane

★ Dashboard Title
9 cards
SmithJohn
SmithJane
AdamsAdam

★ Dashboard Title
19 cards

★ Dashboard Title
30 cards
SmithJohn
SmithJane
AdamsAdam

★ Dashboard Title
8 cards
SmithJohn

★ Dashboard Title
6 cards

Builder-edit

<Cards list  *Tab1 ✏️  ➕

- ➕ Add Preset
- ➕ Add Card
- 📋 Add Text
- 🕐 Time Period
- ⛉ Filter
- Dashboard Details

Data by Day [Last 2 weeks]
Data by Day

□ value 12-09-2018 — 12-16-2018

Data by Merch Group
Data by Merch Group

◇ APPAREL/ACCESS
◇ ESSENTIALS/BEAUTY
◇ FOOD/BEVERAGE
◇ HARDLINES
◇ HOME 12-09-2018 — 12-16-2018

Data w/ Conditional Formatting
Conditional Formatting

| Sales Date | Data% |
|---|---|
| 12-03-2018 | ###% |
| 12-04-2018 | ###% |
| 12-05-2018 | ###% |
| 12-06-2018 | ###% |

Previous  Page 1 of 1  Next

Data (Prior Day)
Data (Multi Dimension)

| Date | Region | Data% |
|---|---|---|
| 12-16-2018 | 100 | ###% |
| 12-16-2018 | 200 | ###% |
| 12-16-2018 | 300 | ###% |
| 12-16-2018 | 400 | ###% |

Previous  Page 1 of 1  Next 600
602
604
650
660

FIG. 10

CALCULATED FIELDS > Edit Ad Ad Comp % Edit Test 2

Select Column Type: All
Ad Ad Comp % Edit

Search columns:
- T ACCT_MO_N
- T ACCT_MO_WK_N
- T ACCT_WK_I
- T ACCT_YR_I
- f₂ AD_BASE_SLS
- f₃ AD_BASE_SLS_Max
- f₃ AD_BASE_SLS_Min
- fx Ad Ad Comp %
- fx Ad Ad Comp % Edit Test 2
- fx Ad Ad Comp Pct
- fx Ad Comp Test Case
- fx CF 1

Select Function Type: All

Search function items:
- Equals
- Interval
- Not Equals
- regex
- like
- Addition
- Subtraction
- Multiplication
- Division
- Sum
- Count
- Doublesum Enter Calculated Field Name*
Ad Ad Comp % Edit Enter Description
Re-Test Ad Ad Comp Edit Enter or paste formula*
sum(MAT_SLS) / sum(AD_BASE_SLS) -1

CLEAR FORMULA    VALIDATE FORMULA

PERMISSIONS
John Smith ⊗  Jane Smith ⊗  Adam White ⊗  Joan Peterson ⊗
Add Owners Select Privacy levels
○ Confidential    ⦿ Internal

SAVE CALCULATED FIELD    CANCEL 1000, 1002, 1004, 1006

FIG. 11

CALCULATED FIELDS > Edit doublesum test new sales WTD

Ad Ad Comp % Edit Test 2

Select Column Type
All

Search columns

| | |
|---|---|
| T | ACCT_MO_N |
| T | ACCT_MO_WK_N |
| T | ACCT_WK_I |
| T | ACCT_YR_I |
| f₃ | AD_BASE_SLS |
| f₃ | AD_BASE_SLS_Max |
| f₃ | AD_BASE_SLS_Min |
| fₓ | Ad Ad Comp % |
| fₓ | Ad Ad Comp % Edit Test 2 |
| fₓ | Ad Ad Comp Pct |
| fₓ | Ad Comp Test Case |
| fₓ | CF 1 |

All
Function
Condition
Aggregate
Equals
Interval
Not Equals
regex
like

← 1002

← 1004

Enter Calculated Field Name*
doublesum test new sales WTD

Enter Description

Enter or paste formula*
doublesum(NET_SLS) where_time interval 'Week to Date'

CLEAR FORMULA    VALIDATE FORMULA

PERMISSIONS
(John Smith ⊗) (Jane Smith ⊗) Add Owners

Select Privacy levels
○ Confidential    ● Internal

SAVE CALCULATED FIELD    CANCEL

← 1006

← 1000

DATA VISUALIZATION TOOL WITH GUIDED VISUALIZATION CREATION AND SECURE PUBLICATION FEATURES, AND GRAPHICAL USER INTERFACE THEREOF

BACKGROUND

Today's data visualization tools (typically, used for displaying business analytics dashboards, and the like) are designed to allow users to create data visualizations that allow users to better understand a data set. Such data visualizations often require aggregation of large amounts of data, often from many different data sources. In many instances, a single user or user group will create a data visualization that may be consumed, or viewed, by a larger user group.

In such an environment, users who create complex data visualizations are often required to have a significant amount of knowledge about the underlying data set on which the visualization is based, as well as some knowledge of a querying language used to access that data. Additionally, users or groups wishing to view data visualizations must be notified by the creating user when such visualizations become available for use.

Existing visualization tools allow users to create data visualizations, such as dashboards, from a series of calculations or analyses. Those calculations or analyses are often created first in a separate visualization space, and the dashboard published to a larger user group reflects an amalgamation of those underlying calculations or analyses. This requires the user creating the visualization to create piece parts of the visualization first, in separate workspaces, and integrate those workspaces into the visualization. This requires significant time and effort for the user. Still further, the user may need significant knowledge of an underlying query language (e.g., SQL) to accurately define portions of the visualization. Such underlying query languages that are known to those users often have limitations in terms of efficiency or effectiveness when large numbers of data records are involved or many data sources are involved. Furthermore, once a data visualization is created, the creating user must somehow notify other users who may wish to view the visualization.

For these and other reasons, improvements in data visualization tools are desired.

SUMMARY

In general, a data visualization tool is described The data visualization tool may include, for example, guided visualization creation features as well as secure are publication features which allow for automated publication of a visualization to users having differing roles or access rights.

In a first aspect, a method includes displaying a user interface including a canvas and a card builder toolset, the card builder toolset including a plurality of selectable options, each of the plurality of selectable options responsive to user input to present a definition screen including one or more card definition parameter input fields. The method further includes receiving user input into the one or more card definition parameter input fields for each of the plurality of selectable options and, in response, defining at least one aspect of a card to be included within a user dashboard presented on the canvas. The method also includes rendering a card within the canvas in accordance with parameters defined by the user input, the card being included within a dashboard to be displayed to users.

In a second aspect, a method of displaying a dashboard to a plurality of different users is provided. The method includes receiving a definition of a data visualization within a dashboard, the dashboard including one or more cards, the one or more cards presenting a data visualization within the dashboard and having a security option associated therewith, and displaying a first visual representation of the dashboard to a first user. The method further includes displaying a second visual representation of the dashboard to a second user, the second visual representation being different from the first visual representation based at least in part on the security option associated with at least one of the one or more cards.

In a third aspect, a computer-implemented data visualization system is disclosed. The system includes a computing system including a processor operatively connected to a memory storing instructions comprising a data visualization application. When the instructions are executed, the cause the system to: generate a user interface including a canvas and a card builder toolset, the card builder toolset including a plurality of selectable options, each of the plurality of selectable options responsive to user input to present a definition screen including one or more card definition parameter input fields; receive user input into the one or more card definition parameter input fields for each of the plurality of selectable options and, in response, defining at least one aspect of a card to be included within a user dashboard presented on the canvas; and generate a rendering of a card within the canvas in accordance with parameters defined by the user input, the card being included within a dashboard to be displayed to users.

BRIEF DESCRIPTION OF THE DRAWINGS

FIG. 3 illustrates an example user interface of a data visualization tool according to an example embodiment.

FIG. 7 illustrates an enlarged portion of the user interface of FIG. 6.

FIG. 10 illustrates an example user interface of a data visualization tool in which calculated fields may be defined, according to an example embodiment.

FIG. 11 illustrates a variant of the user interface of FIG. 10 based on selection of a filter applied to the possible calculations that can be performed.

DETAILED DESCRIPTION

As briefly described above, embodiments of the present invention are directed to a data visualization tool. The data visualization tool may include, for example, guided visualization creation features as well as secure publication features which allow for automated publication of a visualization to users having differing roles or access rights. This has the function of simplifying creation of data visualizations, and can also allow users to automatically be presented with a data visualization according to that user's respective access rights.

In example embodiments, data visualizations within the present disclosure are generally constructed as dashboards that may be viewed by a plurality of users. The dashboards may include charts, tables, or other information that may quickly illustrate data to a user. Such dashboards may also be constructed from cards, each of which may include separate analyses of different data sets.

In accordance with the present disclosure, such a data visualization tool may be described in conjunction with business analytics that are presented to a user within a card or dashboard. The business analytics may be focused, in the examples described herein, on use within a retail organization. However, it is recognized that the applicability of such a data visualization tool is not so limited.

The term "user" in the present disclosure may relate to a user of the data visualization tool who acts as an editor of data visualizations. Such a user may have access rights to certain ones of the user interfaces described herein. Other users may act as consumers of the data visualizations that are created. Such users may be referred to as "viewing users" or "customer users" and may have fewer access or editing rights to a particular data visualization as compared to the editing user.

Figure 1:
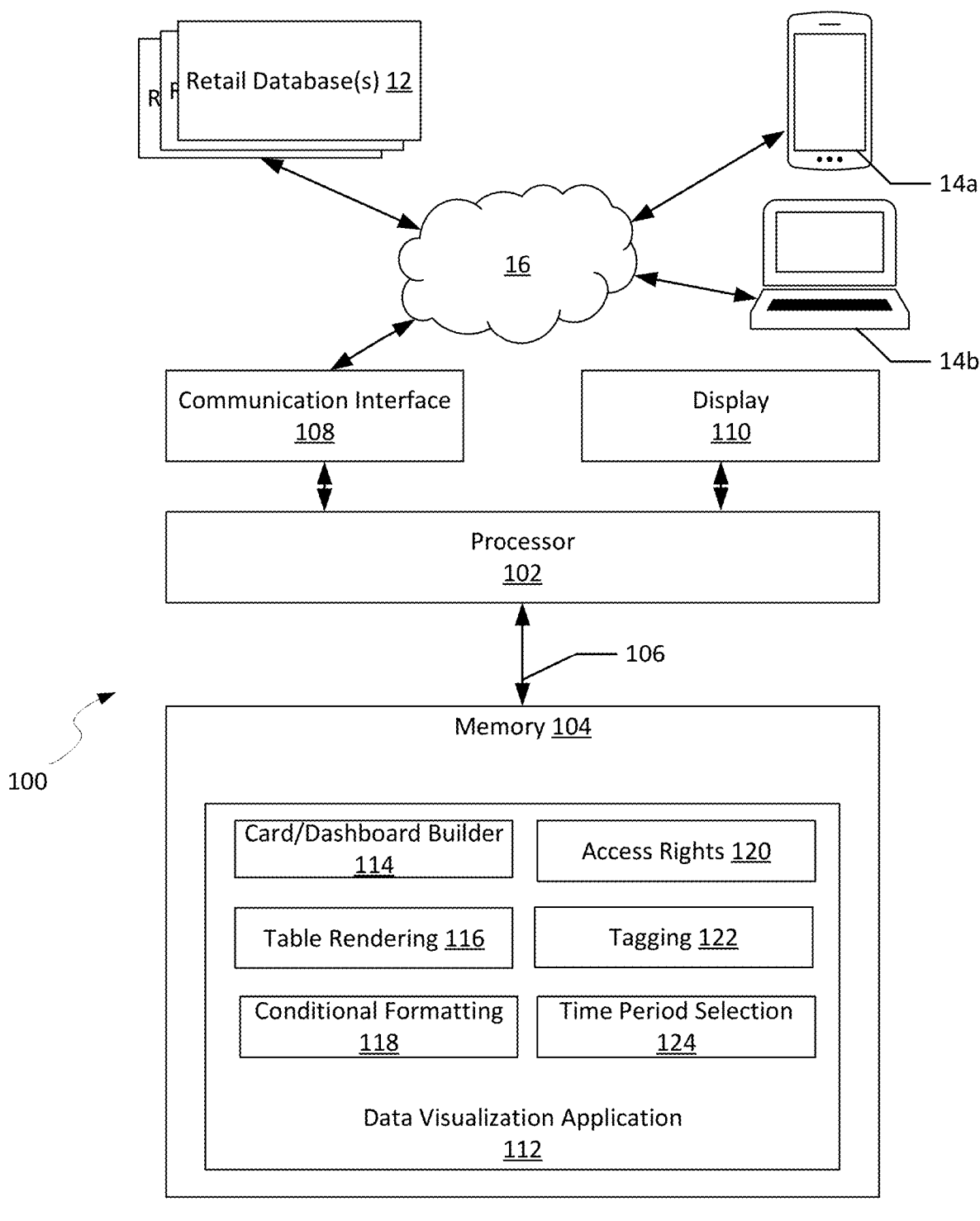
FIG. 1 illustrates an example environment in which a data visualization tool may be implemented.

Referring first to FIG. 1, an example environment 10 is illustrated in which a data visualization tool may be implemented. In the environment 10, a computing system 100 is communicative we connected to a plurality of retail databases 12, as well as other user devices 14 (shown as user devices 14a-b for different users, respectively). The retail databases 12, user devices 14, and computing system 100 maybe communicatively connected via a network 16, such as the Internet.

In the embodiment shown, the computing system 100 includes a processor 102 communicatively connected to a memory 104 via an interface 106. The processor 102 is further connected to a communication interface 108 and a display 110. The communication interface 108 allows the computing system 100 to communicate with other devices via network 16.

In the embodiment shown, the memory 104 stores a data visualization tool 112. The data visualization tool 112 includes a card/dashboard builder 114, a table rendering component 116, a conditional formatting component 118, an access rights component 120, a tagging component 122, and a time period selection component 124. Other components may be included in the data visualization tool 112 as well, in various embodiments.

The card/dashboard builder 114 provides a plurality of selectable options to a user, for example in a builder menu, which may be selected to display additional screens with which a user may define parameters that are used to define a card that will be included in a data visualization. In example embodiments, and as discussed further below, the card/dashboard builder 114 provides a guided card building process in which a graphical user interface presents an untrained user a canvas and a guided set of options, with a set of selected decisions used for defining a card, including creation/modification of a card, defining a card dataset, defining a chart type for inclusion in the card, a time period for relevant data, sorting/filtering criteria, as well as a definition of additional card details and data access rights. The card may be built directly on a canvas to form a dashboard, rather than requiring cards to be built in a separate tab and referenced by a dashboard that is published to a user.

The table rendering component 116 can render data tables within a card or dashboard to present data to a user in a variety of ways. In some embodiments, the table rendering component 116 can cooperatively operate with the conditional formatting component 118 to generate, e.g. data visualizations that may be adjustable in response to user manipulation of graphical elements within the card or dashboard. For example, as noted below, in some embodiments, a user may be able to create a calculated field, which renders, within the data visualization tool, a visualization of a combination of existing data fields within a card without affecting underlying data sets (e.g., by performing a join or other operation on those data sets). For example, data fields that are combined in a particular analysis or visualization may be combined without first requiring that data to be staged in an intermediate table. Instead, the data is appended together or merged at the time a user selects to modify or merge two fields to form a new calculated field or at the time the card or dashboard is updated. Underlying data sources are not modified, and therefore underlying ETL processes do not need to be performed. Additionally, using the table rendering component 116 and/or conditional formatting component 118, such calculated fields may include injected code (e.g., javascript) that allows a user to add significant additional modifications to a particular set of data or visualization.

An access rights component 120 allows users to view a dashboard that includes one or more cards. As discussed in further detail below, different users having different access rights may have different views of the dashboard or of one of the cards based on those different access rights. For example one user may lack access to one or more cards included in the dashboard while a second user they have access to all cards in the dashboard. A creator of a card may set access rights for the card, for example to expose the card to users internal to or external to an organization, with different data access levels. Additionally, some users may be designated as editing users, while other users may be designated as consumers of data visualizations who are not given all rights to, e.g., create and/or edit cards and/or dashboards.

The tagging component 122 allows creators of cards to tag those cards with specific topic of words. Additionally, dashboards may be created and tagged with specific topic words. Consumer users may subscribe to a tag to a mentally obtain access to content as that content is created. In this way, the consumer of a dashboard or card need not have previous knowledge of the card or dashboard to have that card or dashboard exposed to them.

The time period selection component 124 allows a user to select from among a plurality of different time periods for analysis. Although in some embodiments, the time period selection component 124 allows a user to select a date range for analysis, in other embodiments the time. Selection component 124 also allows the user to toggle between a predetermined time period calculated based on a standard calendar, and a time period that is based on a fiscal year calendar (e.g., starting on a different month or day of the week automatically). Examples of such a calendar toggle are provided below in FIG. 14.

Figure 2:
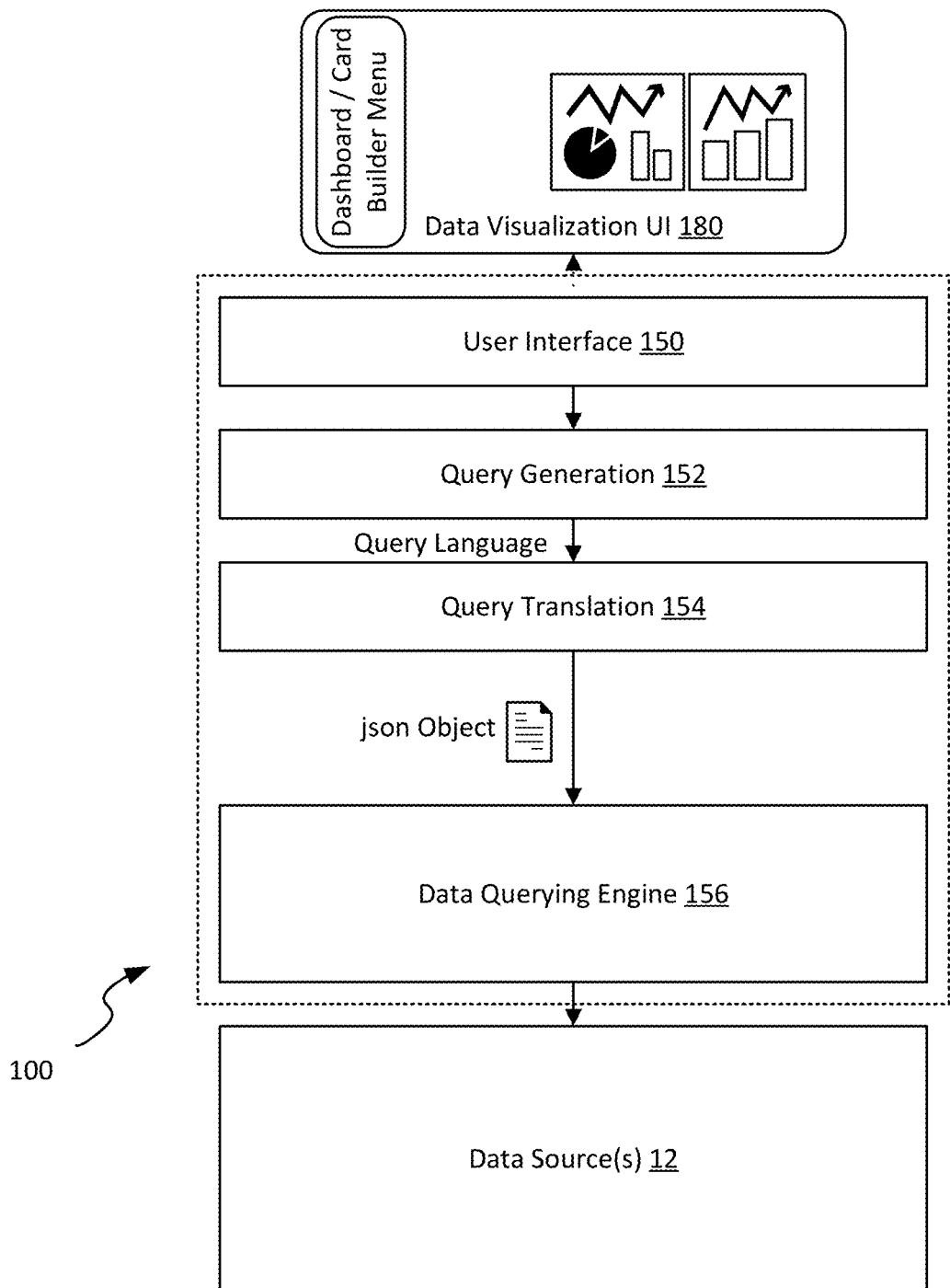
FIG. 2 illustrates an example architecture of a data visualization tool, according to an example embodiment.

FIG. 2 illustrates an example architecture of a data visualization tool, according to an example embodiment. The architecture may be implemented at least in part on a computing system 100 as illustrated in FIG. 1. In the embodiment shown, a computing system 100 is connected to a plurality of data sources 12. The computing system 100 includes a user interface 150, a query generation layer 152, a query translation layer 154, and the data querying engine 156.

The user interface 150 is configured to generate one or more data visualizations in a data visualization user interface 180. The data visualization user interface generally includes a canvas area in which data visualizations may be defined, and a dashboard or card builder menu that guides a user through the process of defining such data visualizations. The user interface 150 generally is hosted for remote viewing by users who either create or view data visualizations.

The query generation layer 152 translates user inputs received in the data visualization user interface 180 into a definition of a data visualization, which may include one or more queries of data sources 12. The query generation layer 152, in some embodiments, translates selection of data sources and data elements within those data sources as queries in a querying language. In some embodiments, the querying language can be a customized language similar to a structured query language (SQL).

The query translation layer 154 receives the query defined in the query language, and translates that query into a package capable of ingestion by the data querying engine 156. In example embodiments, the query translation layer 154 translates the query language into a JSON object that is consumable by the data query engine 156.

In example embodiments, the data query engine 156 can be, for example, implemented using the Druid open source distributed data store and ingestion platform. Use of Druid has the advantage of managing very large quantities of data in queries, with low latency. However, Druid is sometimes not used because it requires formatting of queries submitted to that software as JSON objects. Because traditional data visualizations are generated using structured queries which are significantly more readable to a user than JSON objects, it can sometimes be difficult to implement data visualization solutions via such a data query engine 156. However, through the use of a customized query language implemented by the query generation layer 152, as well as a query translation layer 154 that accurately translates those custom queries into appropriately formatted objects, the high quantity, low latency querying advantages of Druid may be realized in the data visualization tool described herein.

FIG. 3 illustrates an example user interface 300 of a data visualization tool according to an example embodiment. The user interface 300 represents an interface that may be presented to a user who either wishes to create cards or dashboards or has subscribed to cards or dashboards for viewing.

In the example shown, the user interface 300 includes a collection of cards in a cards section 302 and a collection of dashboards illustrated in a dashboards section 304. The cards may be presented in either a whole or partial form, while the dashboards may be presented in a summary format. Upon selection of a card or dashboard, the user may be presented with a user interface in which the user may be able to view the entire card or dashboard, or edit the card or dashboard.

In the sample embodiments, a user may set one or more favorites or subscribe to one or more topics as "tags". In such instances, if new cards or dashboards are made available by other users that have a shared topical tag those cards or dashboards may appear in the summary format in the user interface 300.

Figure 4:
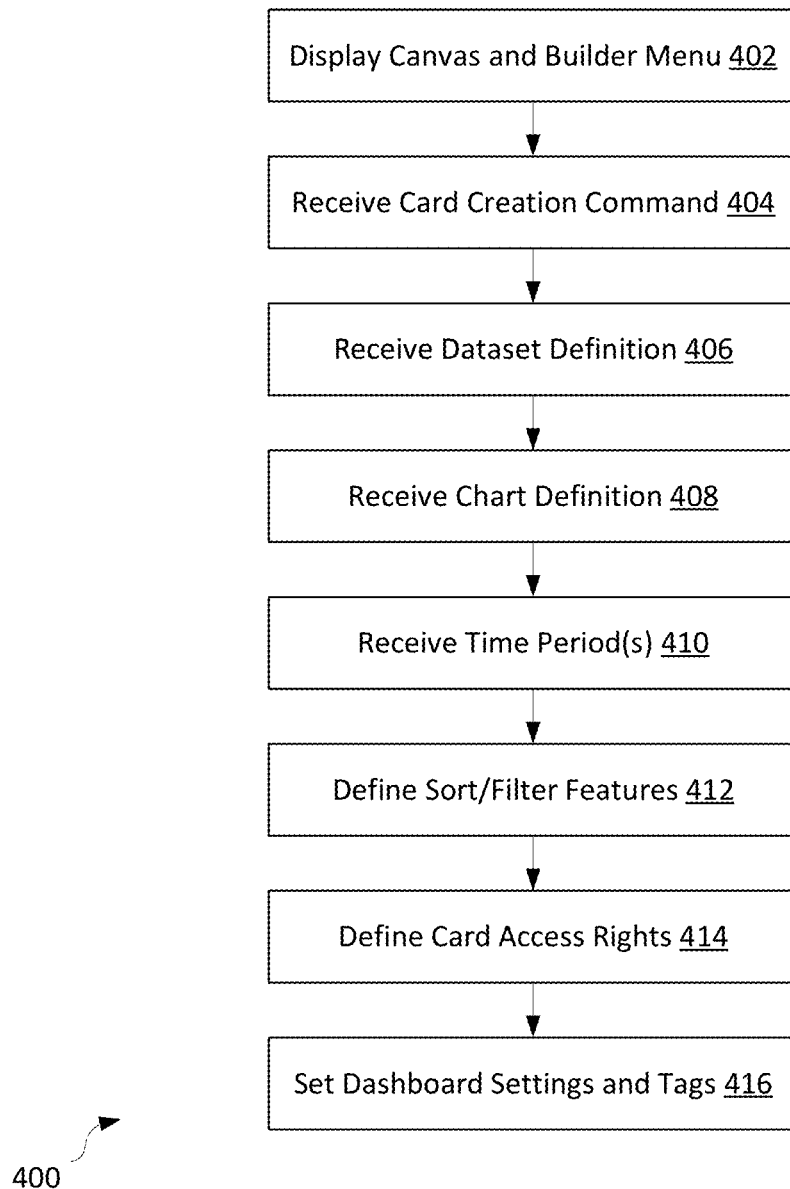
FIG. 4 illustrates an example method of using a card builder tool set within a data visualization tool to create a data visualization, in accordance with an example embodiment.
Figure 6:
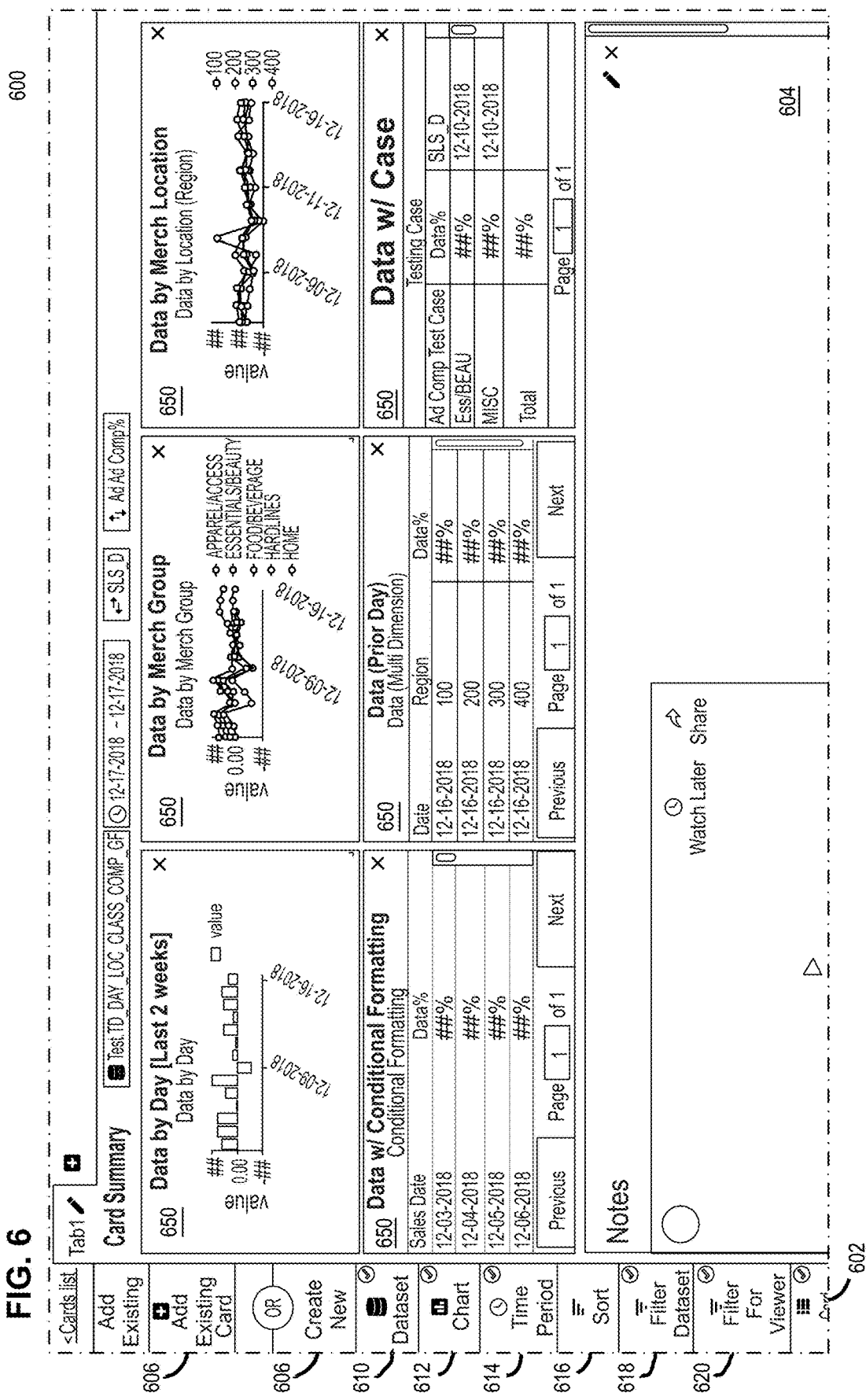
FIG. 6 illustrates an example user interface of a data visualization tool including a card builder region and a canvas, according to an example embodiment.

FIG. 4 illustrates an example method 400 of using a card builder tool set within a data visualization tool to create a data visualization, in accordance with an example embodiment. The card builder tool set may be presented to the user within a user interface generated by a data visualization tool, for example as seen in FIGS. 6-7.

In the embodiment shown, the method 400 includes displaying a user interface including a canvas and a builder menu (step 402). The method includes receiving a card creation command (step 404). Once a card creation command has been received, the all the data visualization tool may also receive a definition of a data set to be used in the card or dashboard (step 406). The data visualization tool may further receive a definition of a chart style (step 408), which represents the type of visualization that the user wishes to view for the selected data set.

In example embodiments, the data visualization tool may receive a definition of one or more time periods upon which to perform analysis (step 410). This can include, for example, defining a start date and end date for the analysis, or selecting a predefined sliding window (e.g., last week, last month, last quarter). In still further implements, this can include receiving selection of a predefined last fiscal period (e.g., a last quarter as defined for the particular entity associated with the data visualization tool, or a last week defined to start on a different, specific day of the week for accounting purposes).

In further example embodiments, the data visualization tool may receive definition of one or more sorting more filtering features (step 412). The filtering features can be defined by the user to allow viewers of the card or dashboard to filter data based on the data included in one or more columns within that visualization. An example of such a filter definition is provided below, discussed in conjunction with FIGS. 12-13.

In still further example embodiments, the data visualization tool may receive a definition of card access rights for a given card or dashboard (step 414). For example, the data visualization tool may receive part details including a setting of whether the card is intended for confidential or internal use only. If considered confidential, a card may be accessible to users outside of an organization who have adequate access rights. If considered internal use only, even those users having access rights to confidential information may not have access to information on the card, if those users are not within the organization. Examples of permission settings are provided in the user interface 1000 shown in FIGS. 10-11.

In the example shown, the data visualization tool receives one or more dashboard or card settings, as well as one or more tags (step 416). Such card or dashboard parameters may be defined in the builder menu, for example after selecting a card details selectable region as described below. The tags may be defined as one or more keywords associated with a dashboard or card that may describe the contents of that card. For example, a tag may be defined such as "quarterly sales" or "same store performance". Another user may search for such a tag or may subscribe to such a tag in a user's home page (e.g., in a user interface analogous to FIG. 3) to obtain access to such tagged cards or dashboards automatically once they are published and therefore accessible to the user.

Figure 5:
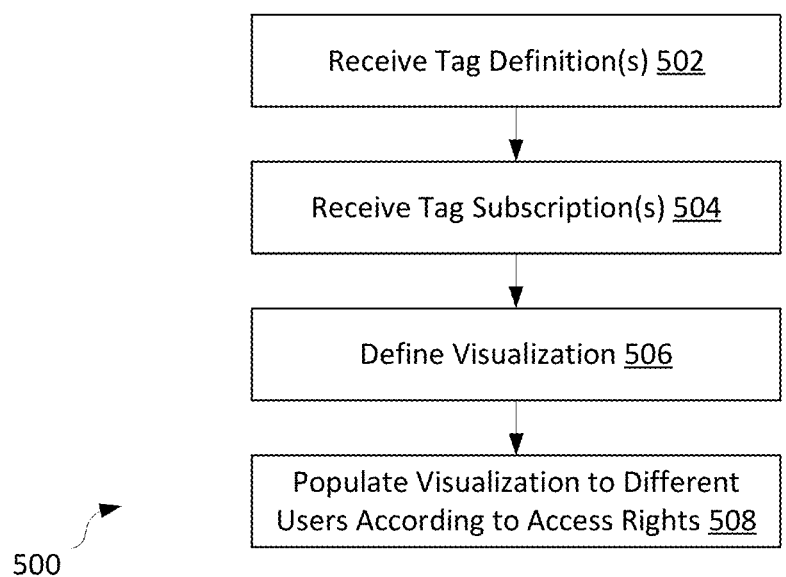
FIG. 5 illustrates an example method of publishing visualizations to different users based on tags, subscriptions, and access rights, according to an example embodiment.

FIG. 5 illustrates an example method 500 of publishing visualizations to different users based on tags, subscriptions, and access rights, according to an example embodiment. The method 500 may be performed, for example, using a data visualization tool as noted above, for distribution of dashboards and/or cards to various users 14*a-b*.

In the example shown, the method 500 includes receiving tag definitions from a user who is a creator or editor of a card or dashboard (step 502). As noted above, the tag definitions may be any keyword that would likely be searched or desired by users who wish to find the card or dashboard, such as "quarterly sales", "trending sale items", "same store performance", or similar words/phrases. A tag subscription can then be received from two different users. For example, a first user internal to the organization whose data is used to create the data visualization may subscribe to any tags associated with "quarterly sales" and "trending sale items", and a second user who is external to the organization but has at least some access rights to view data visualizations may subscribe to "trending sale items". Once a dashboard or card is fully defined and therefore published for access by other users (step 506), a notification regarding the card is populated to the different users who subscribed to the tag associated with that dashboard or card.

Continuing the above example, the "trending sale items" visualization may be a dashboard that has a plurality of associated cards. Some of those cards may be set to a confidentiality level of "internal only" while other cards may simply be set to a confidentiality level of "confidential". Those "internal only" cards may only be presented within the "trending sale items" visualization to the first user and not to the second user, due to differences in data rights. However, both users would automatically be notified of the existence of the data visualization since both subscribed to data visualizations according to the associated keyword tag.

Referring now to FIGS. 6-20, additional user interfaces are illustrated which highlight certain features of the data visualization tool described herein, and as briefly described above. The user interfaces may be generated by one or more aspects of a data visualization application, such as the data visualization application 112 of FIG. 1 (e.g., using card/dashboard builder 114).

FIG. 6 illustrates an example user interface 600 of a data visualization tool including a card builder region 602 and a canvas 604, according to an example embodiment. The card builder region 602 includes a plurality of selectable regions, including an add card region 606, a create new dashboard region 608, a dataset region 610, a chart region 612, a time period region 614, a sort region 616, a dataset filter region 618, a viewer filter region 620, and a card details region (partially shown). Generally, a user wishing to define a card or dashboard within the canvas area 604 (in which six cards are currently shown, as well as a notes region).

In general, defining a card requires a user to select each of the selectable options to define parameters required to create a data visualization within a card. Similar parameters are required for definition of a dashboard as well.

As seen in FIG. 6, and better seen in the portion of the user interface 600 shown in FIG. 7, each of the selectable regions may include an indicator that indicates whether parameters associated with the selectable reaching have been set for a particular card or dashboard. In the example shown, a checkmark may be included in the selectable region to indicate that the selectable region has been selected and parameters associated with that selectable region has been set for the card that is currently selected. In some examples, when a card is not fully defined, indicia may be displayed (e.g., an "x" or other visible mark) indicating that a parameter must be defined that is associated with the selectable region prior to the card or dashboard being able to be completed and rendered.

As shown generally in FIG. 6, use of the card builder region 602 in association with the canvas 604 allows a user to define cards directly on a canvas area that may also store dashboards. This has significant advantages in terms of time and effort required to create cards and dashboards, because a user will not be required to first create intermediate visualizations in a first workspace to import into a dashboard; all work may be performed concurrently.

Figure 8:
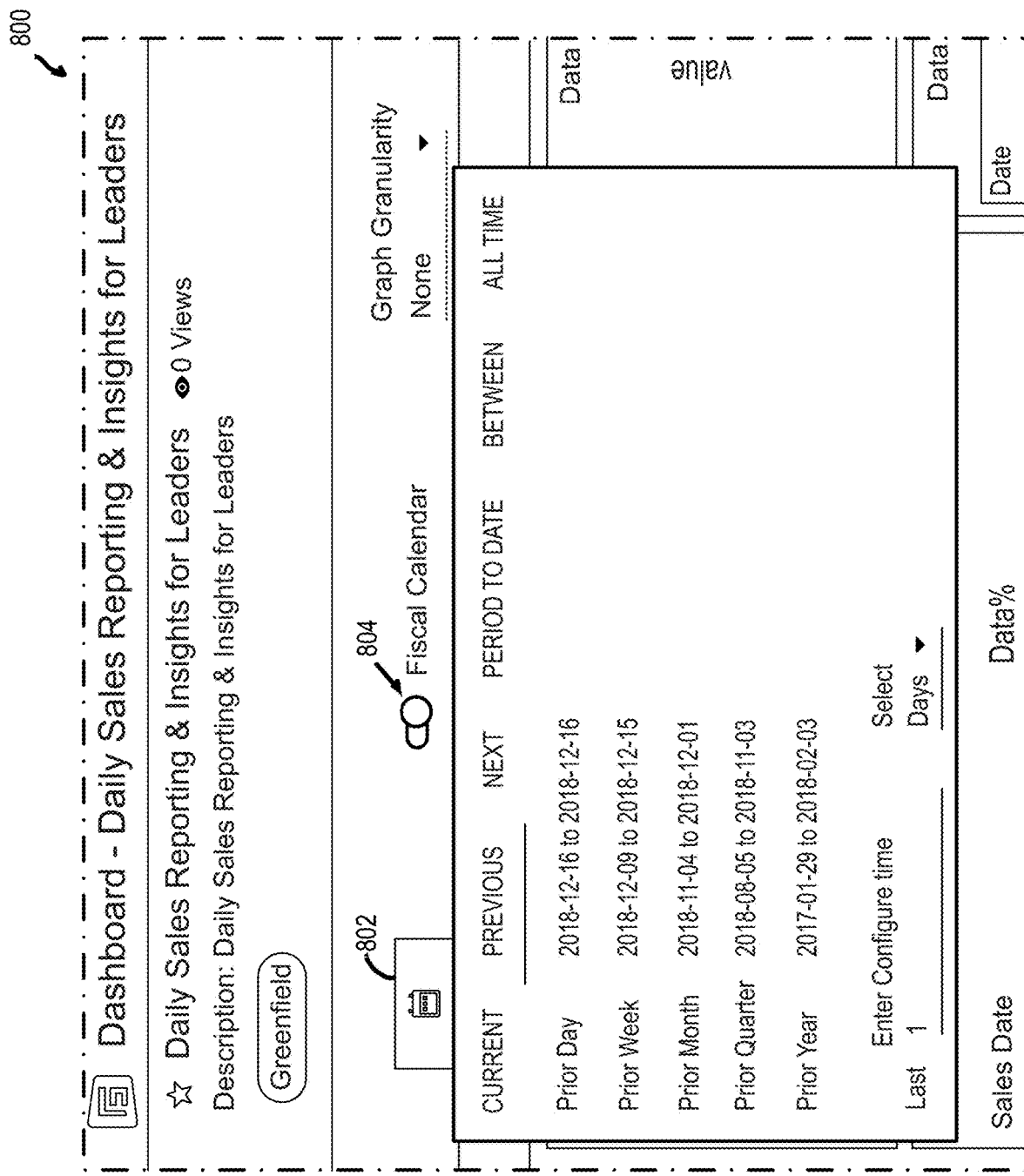
FIG. 8 illustrates an example user interface of a data visualization tool in which a calendar-based time period may be defined for analysis of data within a dashboard, according to an example embodiment.
Figure 9:
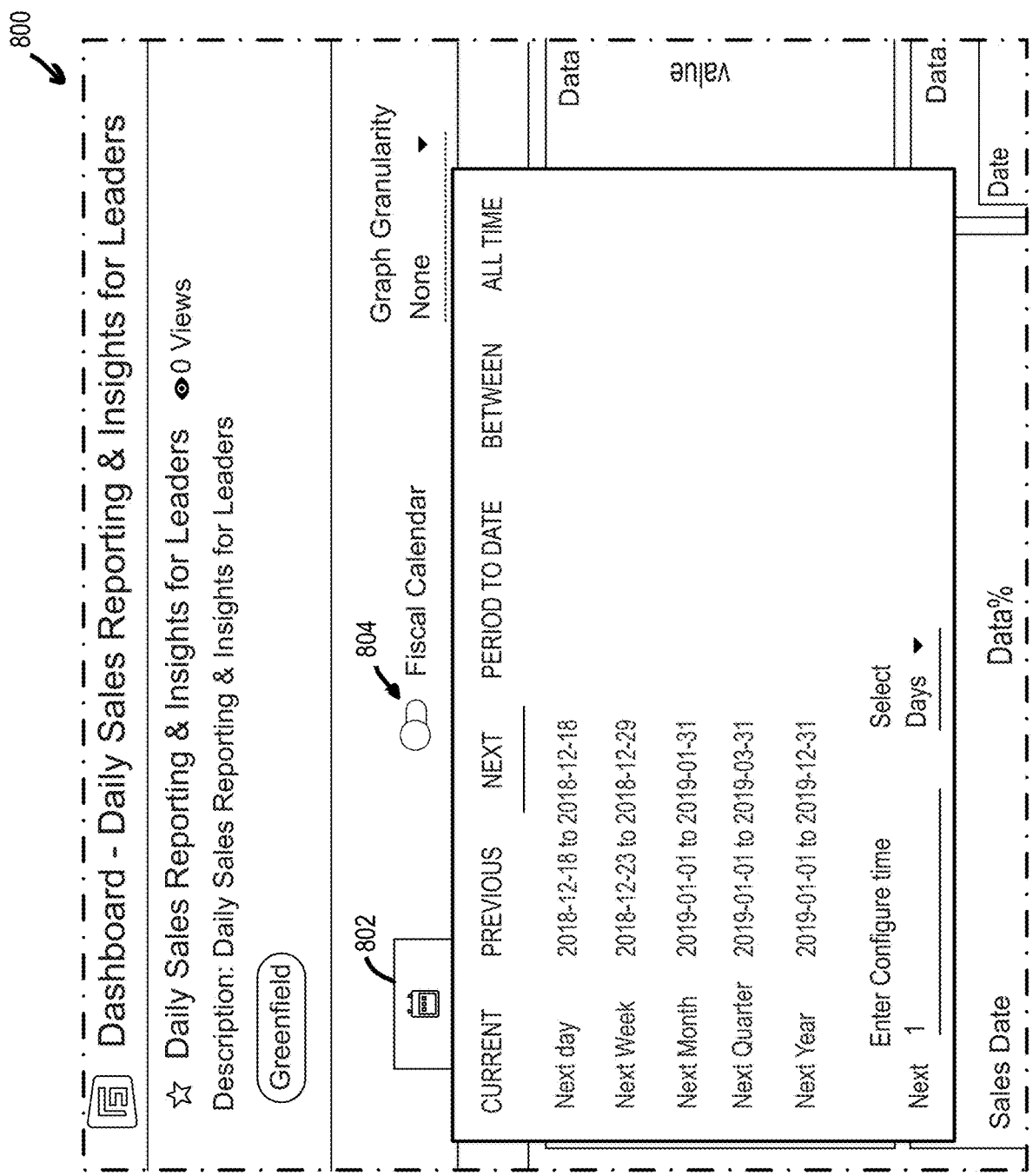
FIG. 9 illustrates an example further version of the user interface of FIG. 8.

FIGS. 8-9 illustrate a user interface 800 of a data visualization tool in which a calendar-based time period may be defined for analysis of data within a dashboard, according to an example embodiment. The user interface 800 represents an example dashboard showing a data visualization of daily sales. In the example shown the dashboard includes a date selector 802 and a calendar selection toggle switch 804. The date selector 802 allows a user to define a date range for analysis, for example a prior day, proctor week, prior month, prior quarter, or prior year. In the example shown the calendar selection toggle switch 804 is activated, and therefore the periods of time shown in the date selector represent dates that correspond to a fiscal calendar of the organization. By way of comparison, in FIG. 9, the calendar selection toggle switch 804 remains unselected. In that version of user interface 800, the time periods (in this case, a next time period rather than previous time period) are set based on a traditional calendar, rather than on a fiscal calendar. Accordingly, in certain embodiments described herein, graphical elements may be provided that allow a user to quickly and conveniently swap between organization-relevant time periods and time periods typically used external to the organization.

FIGS. 10-11 illustrate an example user interface 1000 of a data visualization tool in which one or more calculated fields may be defined within a card or dashboard. Calculated fields, in accordance with the present disclosure, correspond to fields which may be generated based on other fields already included in the card or dashboard or defined as being included in data sources. In the example user interface 1000 as shown, a user may search for and select fields in previously-identified data sources in a field selection region 1002, and define one or more functions to be applied to those fields from a function selection region 1004. As seen in FIG. 10, functions can include, for example, various Boolean and mathematical operations that may be performed on a plurality of data fields that are included in the card or dashboard. A calculated field definition sub-window 1006 allows the user to name the calculated field and manually edit a calculation to be performed across data fields. Additionally, permissions may be granted to the calculated field and to the card overall, as noted above (e.g., to define owners of a card who are allowed to edit the card or dashboard, as well as a privacy level which defines whether only internal users may view the card or dashboard or whether authorized external users may also have viewing rights).

As seen in FIG. 11, a selection window 1102 allows a user to select a specific type of calculated field to filter among the calculations that may be performed. In the example shown, a variety of function, condition, and aggregate calculations are illustrated as being available to be performed on particular data sources; in alternative embodiments, other types or categorizations of data fields may be provided as well.

In example embodiments, the available types of calculated fields can be implemented as code embedded within a particular card or dashboard that allow certain fields to be formed at the time the card is displayed. The code may embed calculations into the definition of the card or dashboard such that, at the time of display of the card or dashboard, each of the underlying data sources can be accessed and, embedded within the card, various data manipulations may be performed prior to display of data. For example, embedded code (e.g., javascript) may be used to, e.g., join data fields by calculating a sum or other mathematical derivation of the underlying data fields, without requiring a join between two heterogeneous data sources to be performed prior to that calculation, and without making that calculation apparent/visible to a non-editing user of the card or dashboard. In example embodiments, such embedded code may automatically be added to the card or dashboard based on graphical user manipulations of data, e.g., to combine particular data fields to display predefined calculations from user-definable data sources.

Figure 12:
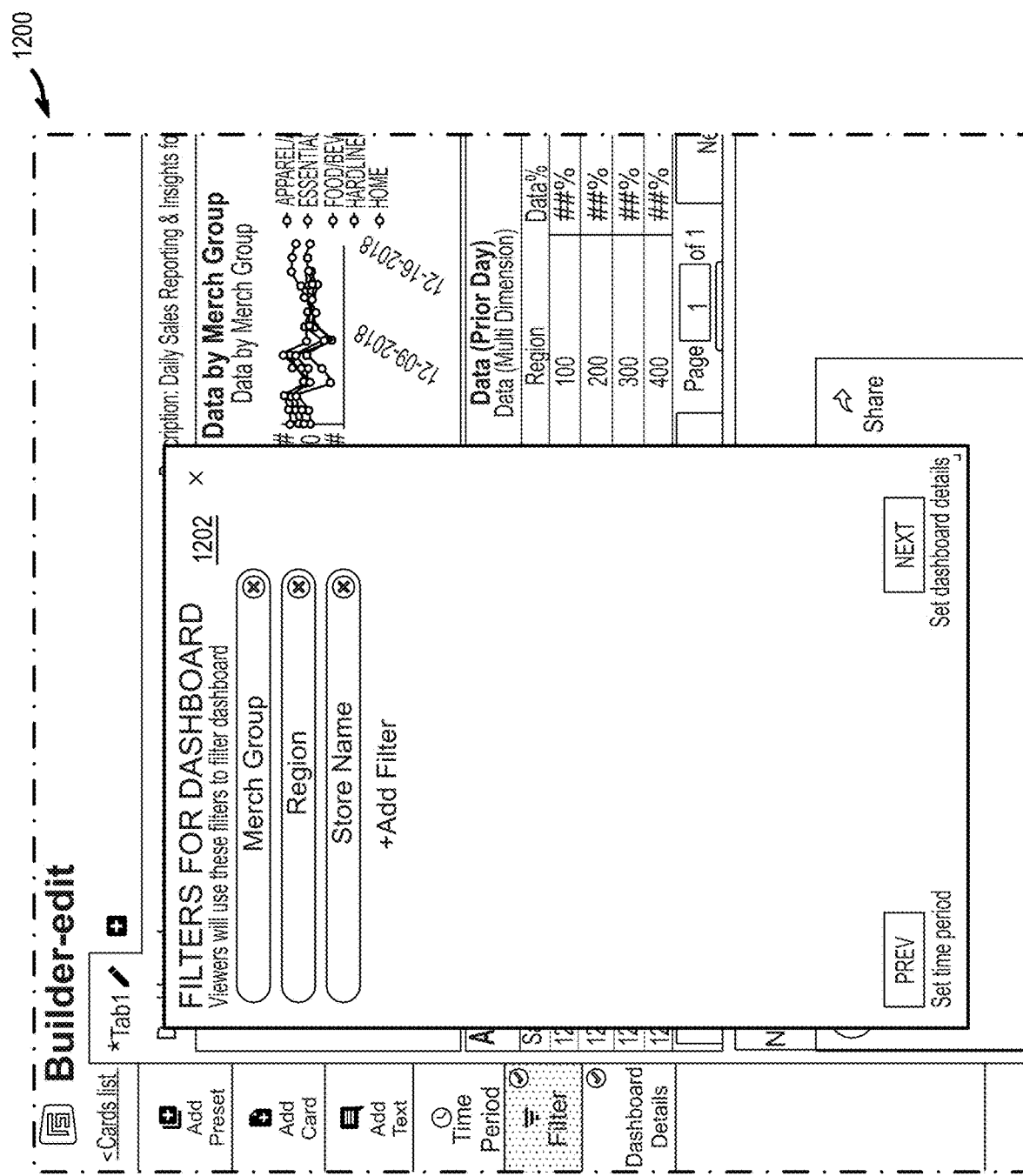
FIG. 12 illustrates an example user interface of a data visualization tool in which filters may be added to a dashboard, according to an example embodiment.
Figure 13:
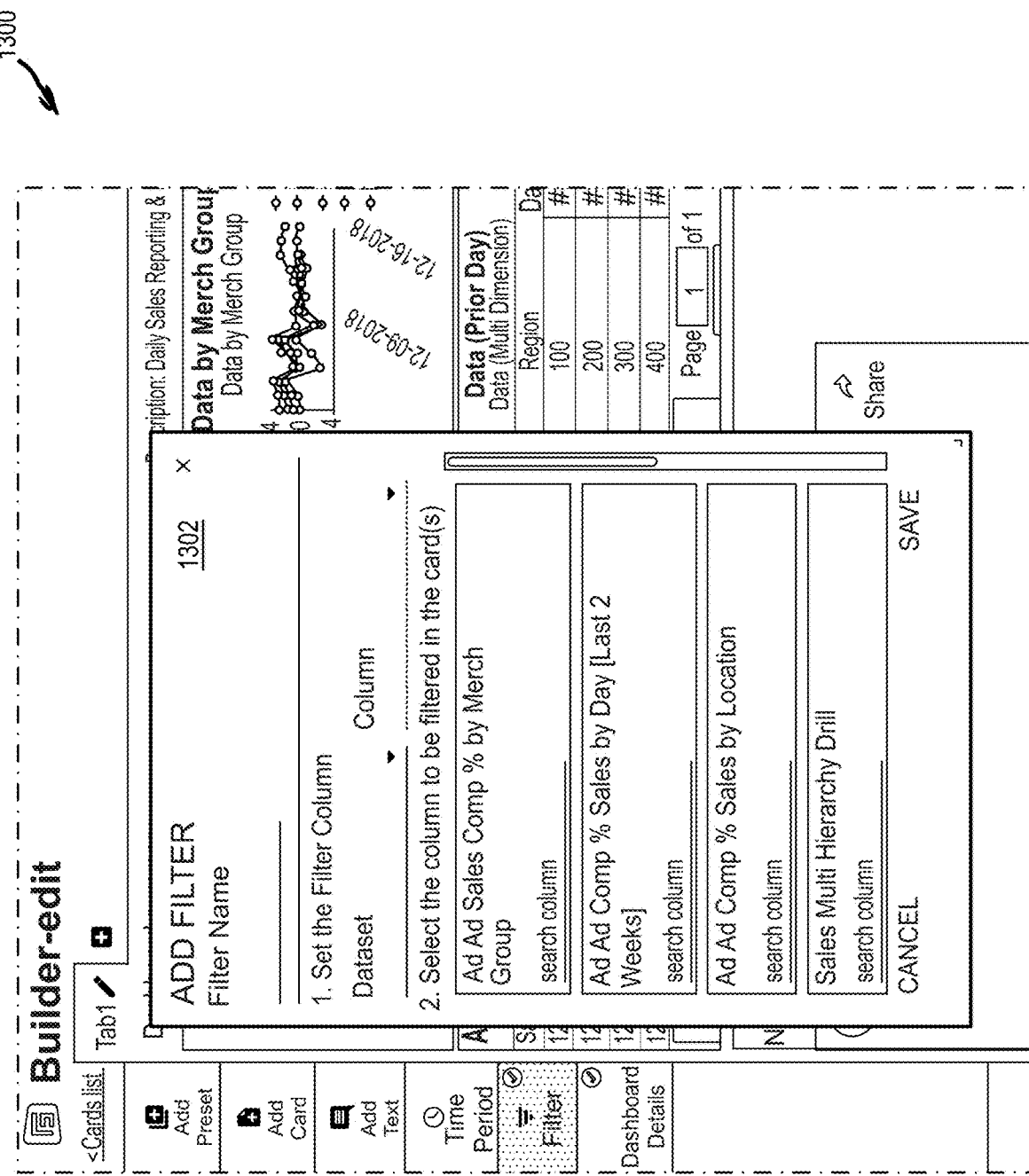
FIG. 13 illustrates a further example user interface of a data visualization tool in which filters may be added to a dashboard, according to an example embodiment.

As illustrated in FIGS. 12-13, a further example user interface 1200 is shown which may be displayed upon selection of a filter option (e.g., viewer filter region 620) of a builder region 602, in the user interface 600 of FIG. 6. In the example shown, the user interface 1200 allows a user to define one or more data filters that can be applied to data within a dashboard that is created or edited by the user, via a filter definition tool 1202. As seen in FIG. 13, a further user interface 1300 can be displayed upon selecting to add a filter within the user interface 1200. The user interface 1300 presents a further filter addition screen 1302 that allows a user to name a filter, and define a dataset and column to be filtered based on the selected filter. The filter may then be saved for use by other users who may elect to view the card or dashboard.

Figure 14:
FIG. 14 illustrates an example column swap operation within a user interface of a data visualization tool, according to an example embodiment.

FIG. 14 illustrates an example column swap operation within a user interface 1400 of a data visualization tool, according to an example embodiment. In the example shown, the user interface 1400 depicts a dashboard having a plurality of data columns. A user may select a swap column option 1402 that can be activated by selecting a column, which leads to display of a swap screen 1404. The swap screen 1404 allows a user to swap the selected column with another dimension for analysis. In the example shown, a column "division" can be swapped with various other dimensions to provide analysis along that other dimension such as, e.g., household income, ethnicity, primary market, fiscal week, family life stage, etc.

In example embodiments, the column swap can be performed, as with the calculated fields and the filters, without reconfiguration of underlying databases 12, or performing additional ETL operations to modify underlying data.

Referring to FIGS. 15-19, various additional user interfaces are illustrated that are useable by various users to define, navigate, and view drill-through visualizations using the data visualization tool described herein. In particular, the user interfaces disclosed herein allow an editing user to define drill-through visualizations quickly on large-scale data using a card-based interface, while also allowing an end user (e.g., a consumer of the analysis) to easily view up-to-date records across vast datasets in various ways. Accordingly, the tools described herein enable a display of a drill-through tool useable to define an interrelationship among a plurality of cards as an ordered sequence. Each of the cards may display a different different graphical depiction of data at a different level of detail.

Figure 15:
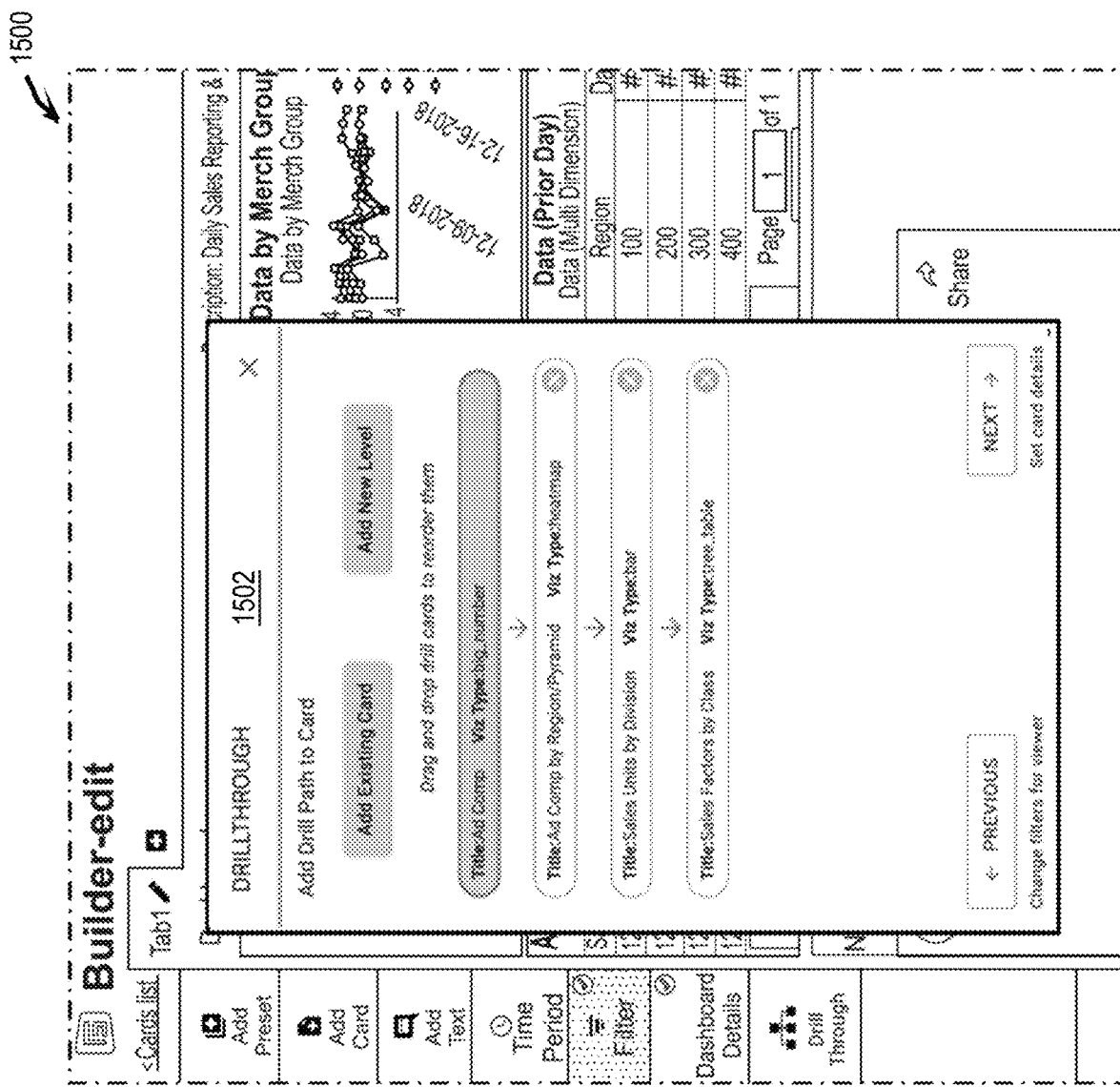
FIG. 15 illustrates an example user interface of a data visualization tool in which a drill-through operation can be defined, according to an example embodiment.

FIG. 15 illustrates an example user interface 1500 of a data visualization tool in which a drill through tool 1502 is shown. In the drill-through tool 1502, drill-through operation can be defined, according to an example embodiment. In general, a drill-through operation refers to a circumstance in which a user selects a particular data visualization or dataset, and rather than a drill-down, which leads to an underlying subdivision or sub-categorization (breakdown) of that visualization or dataset, other, predefined and related data may be provided to that user. For example, a report illustrating sales by region may be selected to show a related, relevant report such as a pictorial of a geographic region illustrating a heatmap of sales, or an analysis grid that is arranged based on some alternative breakdown (e.g., by type of item sold, or along some other metric). It is recognized that similar types of graphics could be used.

Specifically in the example shown, upon selection of the drill-through tool 1502, a user interface 1500 is shown in which a user may be allowed to define a drill path for a particular card. Specifically, as shown the user may be allowed to either add an existing card (i.e., to add a new type of visualization to a drill path from an existing card), or add a new level to the current drill through sequence (e.g., adding a new card to the overall drill sequence). In the example shown, an editing user may elect to change filters that are used in each of the cards associated with the drill path, or otherwise can set card details for a currently selected card. In the example shown, the user interface 1500 displays a card sequence that may be manually reordered, for example by a drag and drop process.

In the particular example shown, a top level card "Ad Comp" allows a user to select the visualization to drill through to an "Ad Comp by Region" visualization. The "Ad Comp by Region" visualization permits drill through to a "Sales Units by Division" visualization, which may subsequently be drilled through to a "Sales Factors by Class" visualization. If each of these visualizations may have different visualization types, such as a heat map, bar, or tree table. An example drill through visualization sequence based on the defined sequence using the tool depicted in the user interface 1500 is seen in FIGS. 17-20, below.

Figure 16:
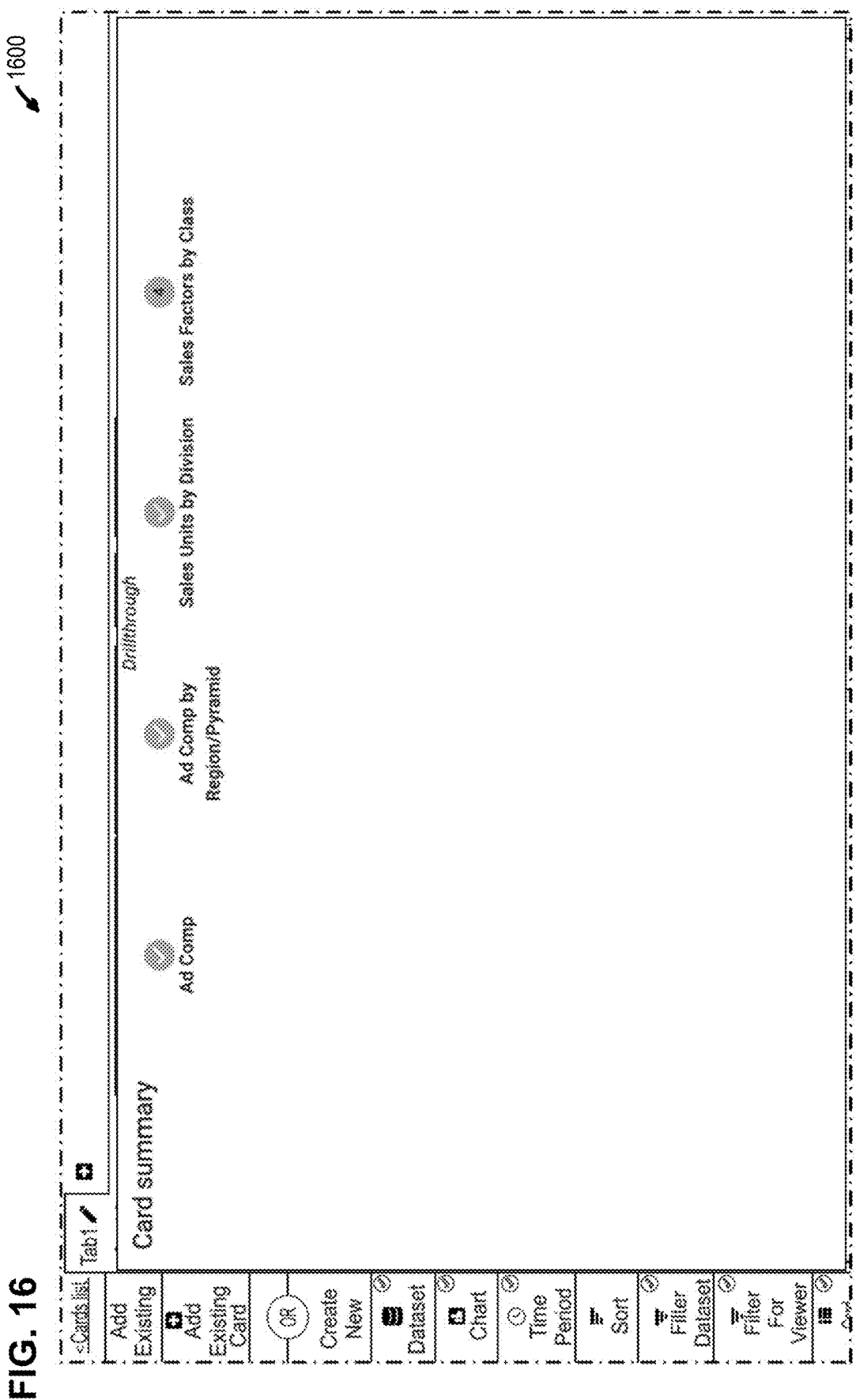
FIG. 16 illustrates an example user interface of a data visualization tool in which defined levels of a drill-through operation can be viewed and navigated during editing, according to an example embodiment.

FIG. 16 illustrates an example user interface 1600 of a data visualization tool in which defined levels of a drill-through operation can be viewed and navigated during editing, according to an example embodiment. In the example shown, the user interface 1600 allows a user to select a particular card, and in particular a card summary card. In this example, each of the defined cards that are including a drill through sequence are listed, and the cards may be selected for patenting from the card a summary. By selection of one of the cards, the user may perform further editing operations on that card, for example to change an appearance or dataset associated with the card.

Figure 17:
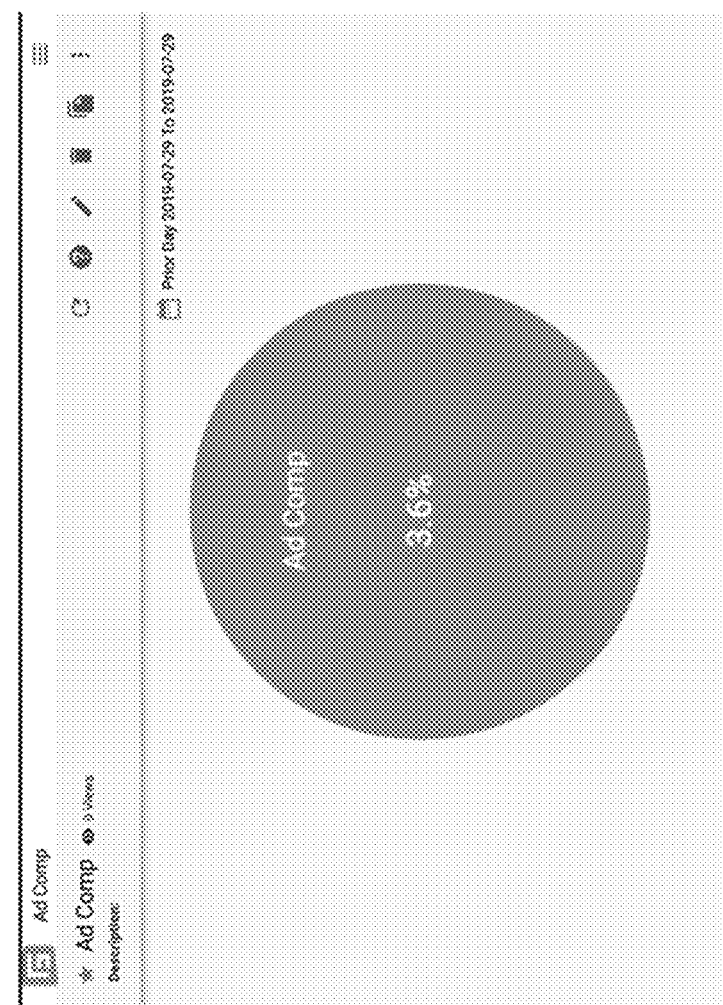
FIG. 17 illustrates an example user interface of a data visualization tool in which a user may conduct a predefined drill-through operation, according to an example embodiment.

Referring now to FIGS. 17-20, a sequence of user interfaces is shown that displays an example drill through sequence that may be defined, for example using the user interfaces of FIGS. 15-16. FIG. 17 illustrates an example user interface 1700 of a data visualization tool in which a user may conduct a predefined drill-through operation. In this example, an "Ad Comp" top level data set is displayed within a card. Upon user selection of the graphic within the user interface 1700 (e.g., by double clicking or otherwise selecting the graphic), a further user interface 1800 seen in FIG. 18 may be displayed. As seen in that Figure, while the top level data visualization showed only a single statistic, the first drill down illustrates the same general topic, but within a different type of visualization and broken down along particular characteristics (e.g., by region and item type).

Figure 18:
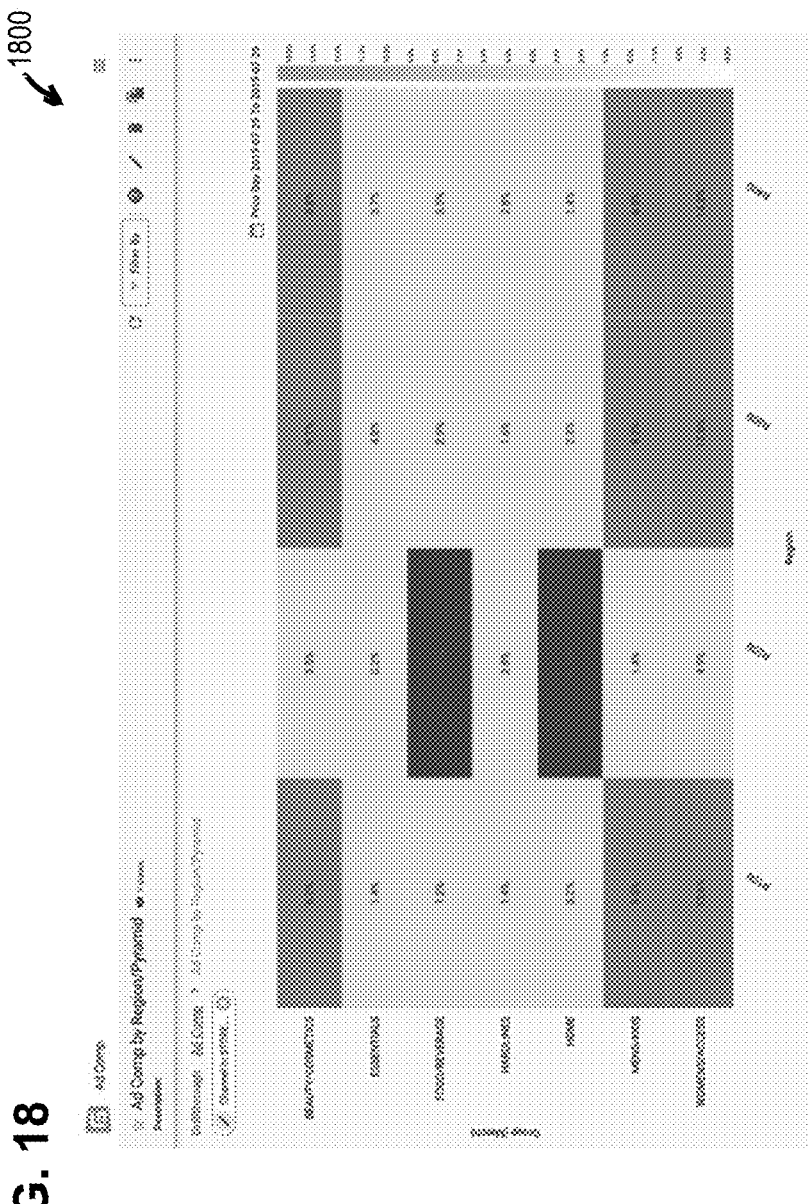
FIG. 18 illustrates a further example user interface showing a drill through operation from the user interface of FIG. 17.
Figure 19:
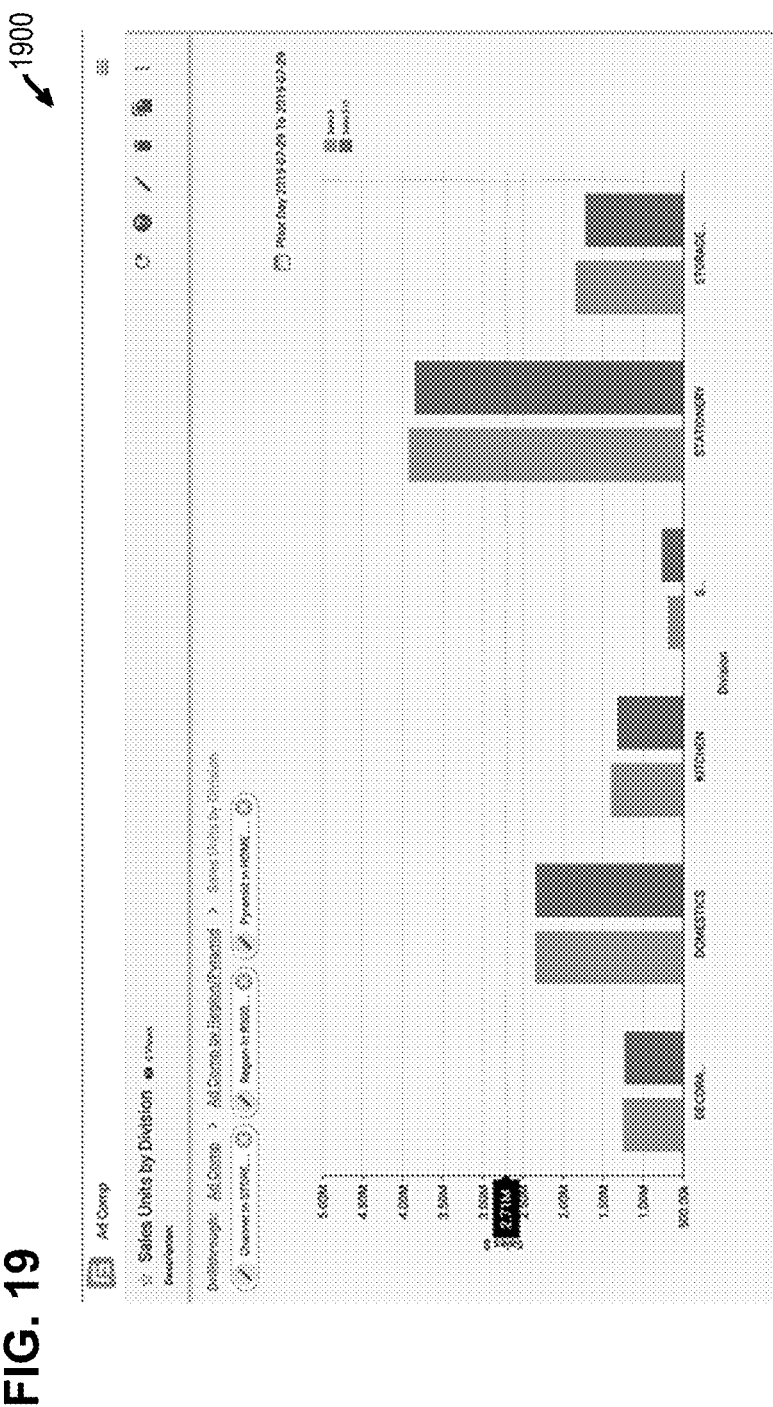
FIG. 19 illustrates a further example user interface showing a drill through operation from the user interface of FIGS. 17-18.
Figure 20:
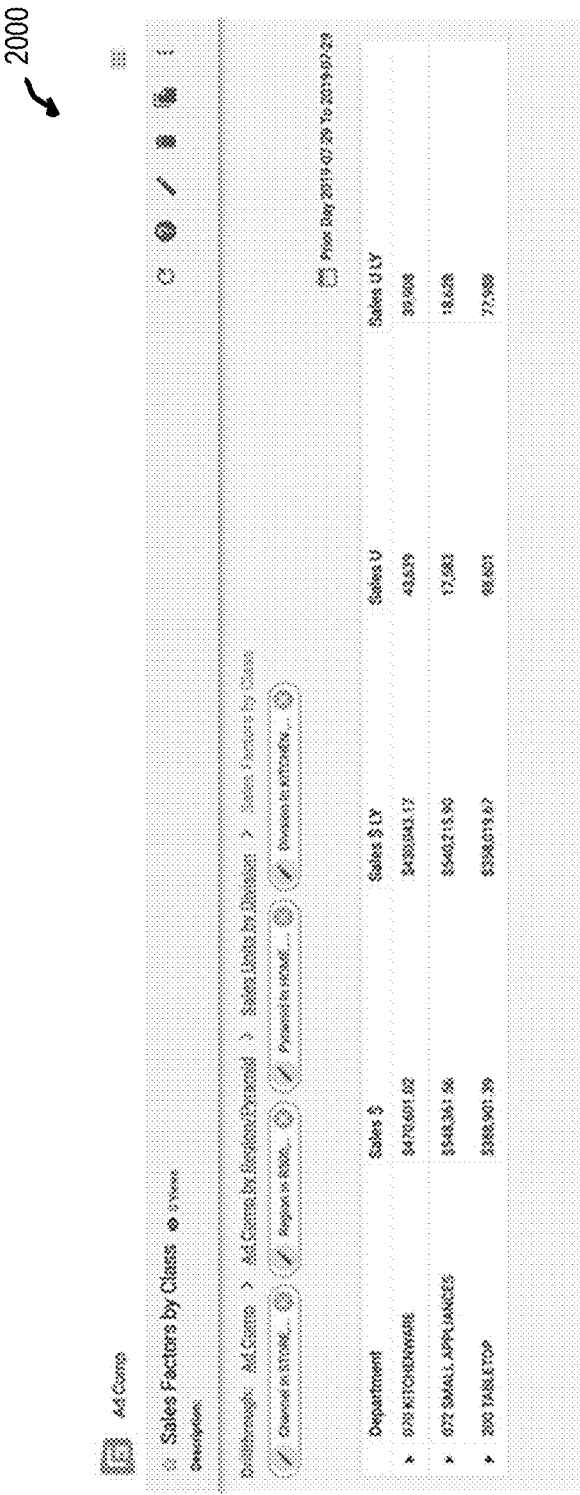
FIG. 20 illustrates a further example user interface showing a drill through operation from the user interface of FIGS. 17-19.

Still further, in FIG. 19, a further drill-through operation results in display of a user interface 1900 in which sales units by division are displayed after a particular region was selected in the user interface 1800 of FIG. 18. In this example, a bar chart is illustrated, after selection of a particular region on a heat map of FIG. 18. Furthermore, a user interface 2000 seen in FIG. 20 can display raw data for a selected division which may be selected from the user interface 1900 of FIG. 19.

Accordingly, referring to FIGS. 15-20 overall, it is seen that in accordance with the present disclosure, the card builder features of the data visualization tool described herein are useable not only to easily define cards in place, but to add drill through features linking cards together, either by newly-creating a visualization in a new card, or by linking to an existing card to establish a relationship therebetween. By way of these drillthrough visualizations, an editing user may easily define navigation paths among the cards that they or others create, to ensure other users (e.g., non-editor, consumer users) have the ability to view data of interest.

Figure 21:
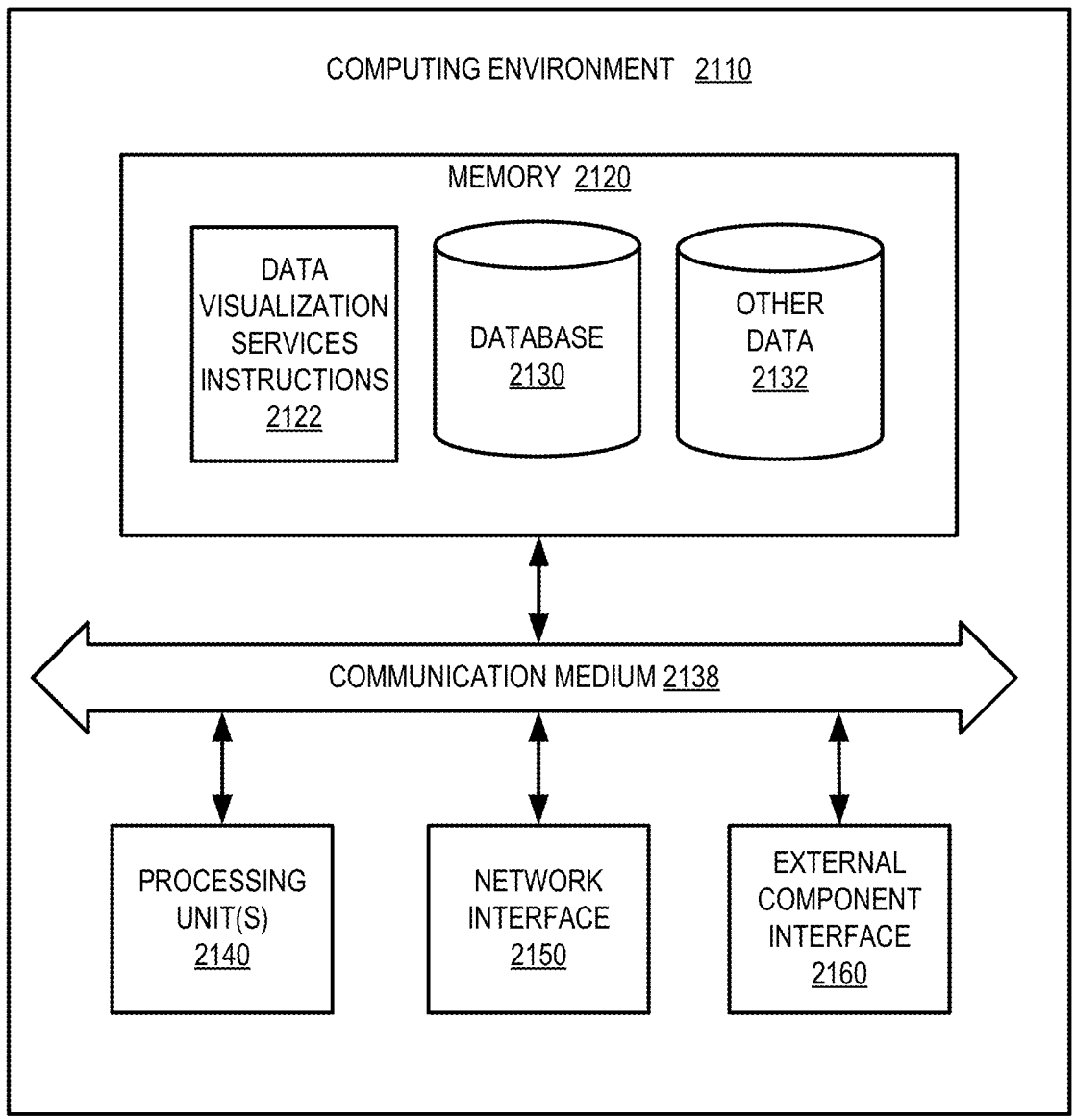
FIG. 21 illustrates an example computing device with which aspects of the present disclosure may be implemented.

FIG. 21 illustrates an example system 2100 with which disclosed systems and methods can be used. In an example, the system 2100 can include a computing environment 2110. The computing environment 2110 can be a physical computing environment, a virtualized computing environment, or a combination thereof. The computing environment 2110 can include memory 2120, a communication medium 2138, one or more processing units 2140, a network interface 2150, and an external component interface 2160.

The memory 2120 can include a computer readable storage medium. The computer storage medium can be a device or article of manufacture that stores data and/or computer-executable instructions. The memory 2120 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 2120 can store various types of data and software. For example, as illustrated, the memory 2120 includes data visualization instructions 2122 for implementing one or more aspects of the data visualization tool described herein, database 2130, as well as other data 2132. In some examples the memory 2120 can include instructions for generating a data visualizations for analysis of organizational data.

The communication medium 2138 can facilitate communication among the components of the computing environment 2110. In an example, the communication medium 2138 can facilitate communication among the memory 2120, the one or more processing units 2140, the network interface 2150, and the external component interface 2160. The communications medium 2138 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 2140 can include physical or virtual units that selectively execute software instructions. In an example, the one or more processing units 2140 can be physical products comprising one or more integrated circuits. The one or more processing units 2140 can be implemented as one or more processing cores. In another example, one or more processing units 2140 are implemented as one or more separate microprocessors. In yet another example embodiment, the one or more processing units 2140 can include an application-specific integrated circuit (ASIC) that provides specific functionality. In yet another example, the one or more processing units 2140 provide specific functionality by using an ASIC and by executing computer-executable instructions.

The network interface 2150 enables the computing environment 2110 to send and receive data from a communication network (e.g., network 16). The network interface 2150 can be implemented as an Ethernet interface, a token-ring network interface, a fiber optic network interface, a wireless network interface (e.g., WI-FI), or another type of network interface.

The external component interface 2160 enables the computing environment 2110 to communicate with external devices. For example, the external component interface 2160 can be a USB interface, Thunderbolt interface, a Lightning interface, a serial port interface, a parallel port interface, a PS/2 interface, and/or another type of interface that enables the computing environment 2110 to communicate with external devices. In various embodiments, the external component interface 2160 enables the computing environment 2110 to communicate with various external components, such as external storage devices, input devices, speakers, modems, media player docks, other computing devices, scanners, digital cameras, and fingerprint readers.

Although illustrated as being components of a single computing environment 2110, the components of the computing environment 2110 can be spread across multiple computing environments 2110. For example, one or more of instructions or data stored on the memory 2120 may be stored partially or entirely in a separate computing environment 2110 that is accessed over a network.

Referring to FIGS. 1-21 overall, it is noted that the methods and systems described herein have a number of advantages over existing systems with respect to generation of data visualizations. For example, the use of the present architecture allows for data visualizations to be generated significantly faster over very large data (billions of records) using the architecture described above. Still further, the graphical user features described herein, including a guided menu for building cards and dashboards, and secure distribution of those cards and dashboards to subscribing users, improve efficiency in both creation and distribution of data visualizations. Still further, the various calculated fields, filters, and column swapping operations described herein may be performed without underlying adjustments to underling data, which makes those operations significantly less time consuming for experienced users while also allowing inexperienced users to readily modify analyses without requiring those users to have familiarity with data structure modification techniques. Other improvements are apparently as well, and illustrated in the present disclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating data visualizations, the method comprising:
displaying a user interface including a canvas and a card builder toolset, the card builder toolset including a plurality of selectable options, each of the plurality of selectable options responsive to user input to present a definition screen including one or more card definition parameter input fields;
receiving user input into the one or more card definition parameter input fields for each of the plurality of selectable options and, in response, defining at least one aspect of a card to be included within a dashboard presented on the canvas;
rendering a card within the canvas, wherein the card is rendered directly on the canvas without using a workspace to create intermediate visualizations, in accordance with parameters defined by the user input, the card being included within the dashboard to be displayed to users;
receiving, via the user interface, a calculated field definition, the calculated field definition defining one or more operations to be performed on one or more datasets included within the card to generate a calculated field, the calculated field being calculated without reconfiguring underlying data sources associated with the one or more datasets; and
displaying the calculated field on the card.

2. The method of claim 1, further comprising displaying a graphical indication on each of a plurality of regions in the card builder toolset that each of the plurality of selectable options has been defined by the user.

3. The method of claim 1, further comprising, upon determining that one or more parameters required to define a card using the plurality of selectable options remains undefined by the user, presenting the user with a graphical indication that additional information is required for the corresponding one or more of the plurality of selectable options.

4. The method of claim 1, wherein the plurality of selectable options includes a dataset option, a chart option, a time period option, a filter option, and a card or dashboard details option.

5. The method of claim 1, wherein the calculated field is defined using a calculated field definition sub-window.

6. The method of claim 1, wherein the card displays the calculated field in response to execution of code included within the dashboard upon the combination of fields.

7. The method of claim 6, wherein the code comprises javascript embedded within a definition of the at least one card.

8. The method of claim 1, further comprising:
displaying a drill-through tool useable to define an interrelationship among a plurality of cards renderable within the dashboard.

9. The method of claim 8, further comprising:
in response to receiving a selection of a first graphic in a first card of the plurality of cards, displaying a second card of the plurality of cards, the second card showing a different visualization to the user based on the interrelationship defined among the plurality of cards.

10. The method of claim 1, wherein the card includes a calendar option, the calendar option allowing a user to toggle between a first calendar window and a second calendar window being different from the first calendar window, the toggle causing a predetermined time period to be automatically adjusted to a different starting point.

11. A computer-implemented data visualization system comprising:
a computing system including a processor operatively connected to a memory storing instructions comprising a data visualization application, which, when said instructions are executed by the processor, cause the computing system to:
generate a user interface including a canvas and a card builder toolset, the card builder toolset including a plurality of selectable options, each of the plurality of selectable options responsive to user input to present a definition screen including one or more card definition parameter input fields;

receive user input into the one or more card definition parameter input fields for each of the plurality of selectable options and, in response, defining at least one aspect of a card to be included within a user dashboard presented on the canvas;

generate a rendering of a card within the canvas, wherein the card is rendered directly on the canvas without using a workspace to create intermediate visualization, in accordance with parameters defined by the user input, the card being included within a dashboard to be displayed to users;

receive, via the user interface, a calculated field definition, the calculated field definition defining one or more operations to be performed on one or more datasets included within the card to generate a calculated field, the calculated field being calculated without reconfiguring underlying data sources associated with the one or more datasets; and display the calculated field on the card.

12. The computer-implemented data visualization system of claim 11, wherein the instructions further cause the computing system to:

translate the user input into a data query;

package the data query into a query object; and access, via a data querying engine, one or more selected data sources from among a plurality of heterogeneous data sources in accordance with the query object.

13. The computer-implemented data visualization system of claim 12, wherein the query object comprises a JSON object.

14. The computer-implemented data visualization system of claim 11, wherein the instructions further cause the computing system to:

generate a display of a drill-through tool useable to define an interrelationship among a plurality of cards, the interrelationship being an ordered sequence of display of the plurality of cards relating to a level of detail displayed in each of the plurality of cards, the plurality of cards providing different graphical depictions at different levels of detail from one another.

15. The computer-implemented data visualization system of claim 11, wherein the data visualization application is accessible via a browser interface from a remote computing system.

16. The method of claim 1, further comprising the steps:

receiving, in the user interface, a definition of access rights for the card;

displaying a first visual representation of the dashboard to a first user of the users;

displaying a second visual representation of the dashboard to a second user of the users, the second visual representation being different from the first visual representation based at least in part on the access rights for the card.

17. The method of claim 16, wherein the first user has a first set of access rights to the card and the second user has a second set of access rights to the card different from the first user, the card thereby being included in the first visual representation and excluded from the second visual representation.

18. The method of claim 16, further comprising:

receiving a subscription request from the first user, the subscription request including one or more tags defining a topic to which the first user would like to subscribe;

associating a tag with the dashboard that is included in the one or more tags; and in response to associating the tag with the dashboard, automatically notifying the first user of the existence of the dashboard.

19. The method of claim 16, wherein the dashboard includes a plurality of cards including at least the card and a second card, the card having a first set of access rights and the second card having a second set of access rights different from the card, and wherein the first visual representation includes the card and the second card and the second visual representation includes the card but excludes at least a portion of the second card based on the first set of access rights and the second set of access rights.

* * * * *